(12) United States Patent
Barry et al.

(10) Patent No.: US 10,033,831 B2
(45) Date of Patent: Jul. 24, 2018

(54) DYNAMIC WORKFLOW GENERATION

(71) Applicant: ADP, LLC, Roseland, NJ (US)

(72) Inventors: James Barry, Brooklyn, NY (US); Benjamin J. Dziuba, New York, NY (US); Amit Maimon, New York, NY (US)

(73) Assignee: ADP, LLC, Roseland, NJ (US)

( * ) Notice: Subject to any disclaimer, the term of this patent is extended or adjusted under 35 U.S.C. 154(b) by 635 days.

(21) Appl. No.: 14/663,682

(22) Filed: Mar. 20, 2015

(65) Prior Publication Data

US 2016/0277536 A1 Sep. 22, 2016

(51) Int. Cl.

| G06F 15/16 | (2006.01) |
|---|---|
| H04L 29/08 | (2006.01) |
| G06Q 10/10 | (2012.01) |
| G06Q 10/06 | (2012.01) |
| G06Q 10/00 | (2012.01) |

(52) U.S. Cl.
CPC .......... *H04L 67/327* (2013.01); *G06Q 10/00* (2013.01); *G06Q 10/0633* (2013.01); *G06Q 10/063114* (2013.01); *G06Q 10/10* (2013.01); *G06Q 10/1097* (2013.01); *H04L 67/10* (2013.01); *H04L 67/22* (2013.01)

(58) Field of Classification Search
CPC ....... G06Q 10/063114; G06Q 10/0633; G06Q 10/10; G06Q 10/0631; G06Q 10/06; G06Q 10/06316; G06Q 10/1097; G06Q 10/06311; G06Q 10/063116; G06Q 10/063118; G06Q 10/06312
See application file for complete search history.

(56) References Cited

U.S. PATENT DOCUMENTS

| 7,761,320 B2 | 7/2010 | Fliess et al. |
|---|---|---|
| D683,738 S | 6/2013 | Wujcik et al. |
| D699,731 S | 2/2014 | Chand et al. |
| | (Continued) | |

OTHER PUBLICATIONS

Kudin, "UI Animation Concept", https://dribble.com/shots/2258225-UI-Animation-Concept, Sep. 23, 2015, Accessed Oct. 13, 2015, 3 pages.

(Continued)

*Primary Examiner* — David R Lazaro
(74) *Attorney, Agent, or Firm* — Anna Linne; Andrew M. Calderon; Roberts Mlotkowski Safran Cole & Calderon, P.C.

(57) ABSTRACT

Systems and methods which implement dynamic workflow generation and related processes are provided. The method is implemented in a computer system. The method includes providing a message panel, which provides linking functionality to link together a plurality of tasks to respective users assigned to complete each task; linking the message panel to a subject topic such that each of the tasks and respective users is linked to the subject topic; sending, in a single electronic communication action, the plurality of tasks assigned to the respective users within the message panel; receiving real-time status data of each of the tasks assigned to the respective users; mapping, within a database, the real-time status data of the plurality of tasks to the linked subject topic; and generating a summary for the tasks linked to the subject topic based on the mapping of the real-time status.

20 Claims, 12 Drawing Sheets

(56) References Cited

U.S. PATENT DOCUMENTS

| | | |
|---|---|---|
| D701,874 S | 4/2014 | Rao et al. |
| D702,702 S | 4/2014 | Carter et al. |
| D720,765 S | 1/2015 | Xie et al. |
| D720,766 S | 1/2015 | Mandal et al. |
| D727,336 S | 4/2015 | Allison et al. |
| D728,607 S | 5/2015 | Scott et al. |
| D728,610 S | 5/2015 | Lee et al. |
| D732,062 S | 6/2015 | Kwon |
| D733,175 S | 6/2015 | Bae |
| D735,213 S | 7/2015 | Kim et al. |
| D745,033 S | 12/2015 | Pal et al. |
| D752,605 S | 3/2016 | Wang |
| D753,164 S | 4/2016 | Vazquez |
| D753,685 S | 4/2016 | Zimmerman et al. |
| D754,165 S | 4/2016 | Park et al. |
| D754,689 S | 4/2016 | Lee |
| D754,690 S | 4/2016 | Park et al. |
| D754,714 S | 4/2016 | Zhang et al. |
| D755,827 S | 5/2016 | Anzures et al. |
| D757,047 S | 5/2016 | Cornwell et al. |
| D761,842 S | 7/2016 | Johnson |
| D763,293 S | 8/2016 | Lee |
| D764,496 S | 8/2016 | Salazar Cardozo et al. |
| D765,678 S | 9/2016 | Goux |
| D766,276 S | 9/2016 | Chaudhri et al. |
| D766,915 S | 9/2016 | Sublett et al. |
| D769,929 S | 10/2016 | Kim et al. |
| D772,924 S | 11/2016 | Begin et al. |
| D774,061 S | 12/2016 | Wu |
| D775,652 S | 1/2017 | Hoang et al. |
| 9,774,561 B1* | 9/2017 | Rapp ............ H04L 51/36 |
| 2002/0078007 A1 | 6/2002 | Herrero ............ G06Q 10/10 |
| 2003/0046134 A1* | 3/2003 | Frolick .......... G06Q 10/063118 |
| | | 705/7.17 |
| 2003/0071860 A1 | 4/2003 | Goddard et al. |
| 2003/0078826 A1* | 4/2003 | Swanke ............ G06Q 10/06 |
| | | 705/7.15 |
| 2004/0021686 A1* | 2/2004 | Barberis ............ G06Q 10/10 |
| | | 715/738 |
| 2004/0243458 A1* | 12/2004 | Barkan ............ G06Q 10/06 |
| | | 705/7.15 |
| 2006/0106846 A1* | 5/2006 | Schulz ............ G06Q 10/10 |
| 2006/0195494 A1* | 8/2006 | Dietrich ............ G06Q 10/10 |
| | | 708/110 |
| 2007/0067199 A1 | 3/2007 | Shine et al. |
| 2007/0100861 A1* | 5/2007 | Novy ............ G06F 17/21 |
| 2007/0192157 A1 | 8/2007 | Gooch |
| 2008/0065460 A1* | 3/2008 | Raynor ............ G06Q 10/06 |
| | | 705/7.21 |
| 2008/0301296 A1* | 12/2008 | York ............ G06Q 10/06 |
| | | 709/225 |
| 2009/0043621 A1* | 2/2009 | Kershaw ............ G06Q 10/06 |
| | | 705/7.16 |
| 2009/0073132 A1 | 3/2009 | Lee et al. |
| 2009/0281865 A1* | 11/2009 | Stoitsev ............ G06Q 10/06 |
| | | 705/7.22 |
| 2010/0299763 A1* | 11/2010 | Marcus ............ G06Q 10/06 |
| | | 726/30 |
| 2011/0197163 A1 | 8/2011 | Jegal et al. |
| 2012/0053978 A1* | 3/2012 | Andersen ............ G06Q 10/06 |
| | | 705/7.14 |
| 2012/0096410 A1 | 4/2012 | Lancaster |
| 2012/0215578 A1 | 8/2012 | Swierz, III et al. |
| 2012/0224057 A1 | 9/2012 | Gill et al. |
| 2014/0052524 A1 | 2/2014 | Andersen |
| 2014/0282046 A1 | 9/2014 | Gonsalves et al. |
| 2015/0081399 A1 | 3/2015 | Mitchell et al. |
| 2016/0132198 A1 | 5/2016 | Sinclair et al. |
| 2016/0140501 A1* | 5/2016 | Figlin ............ G06Q 10/103 |
| | | 705/7.15 |
| 2016/0203434 A1* | 7/2016 | Sivakumar ..... G06Q 10/063118 |
| | | 705/7.14 |
| 2016/0210711 A1 | 7/2016 | Krupa et al. |
| 2016/0224939 A1* | 8/2016 | Chen ............ G06Q 10/107 |
| 2016/0277536 A1 | 9/2016 | Barry et al. |

OTHER PUBLICATIONS

Goia, "Player Card", https://dribble.com/shots/1367095-Player-card, Jan. 6, 2014, Accessed Oct. 13, 2016, 1 page.

"Buttons: Floating Action Button", https://material.google.com/components/buttons-floating-action-button.html, Apr. 14, 2015, Accessed Sep. 30, 2016, 5 pages.

"RUN Powered by ADP Mobil Payroll", https://itunes.apple.com/us/app/run-powered-by-adp-mobile/id388928133?mt=8, Jul. 22, 2016, Accessed Aug. 2, 2016, 2 pages.

Kwak, "Employee Directory for Enterprise", https://dribble.com/shots/2804293-Emplyee-Directory-for-Enterprise, Jun. 28, 2016, Accessed Sep. 30, 2016, 2 pages.

ESolz, "Concept for ProWorkFlow", https://dribble.com/shots/2286718-Concept-for-ProWorkFlow, Oct. 11, 2015, Acessed Sep. 30, 2016, 1 page.

Unknown, "Create Your Business Process in 2 Minutes", https://www.flowmingo.com, Wayout Solutions llc, 2012, 7 pages.

TrackerSuite.net, "Online Project", http://trackersuite.net/, 2013, 2 pages.

* cited by examiner

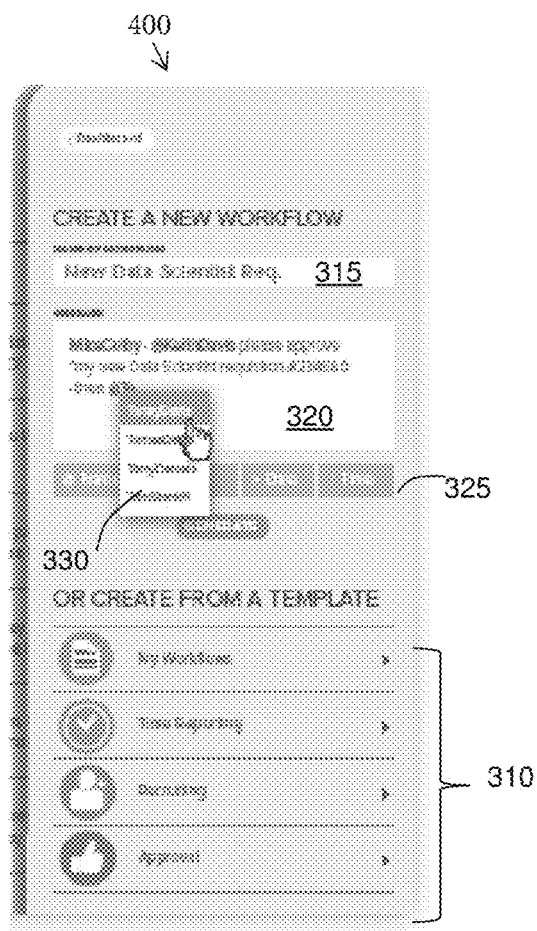
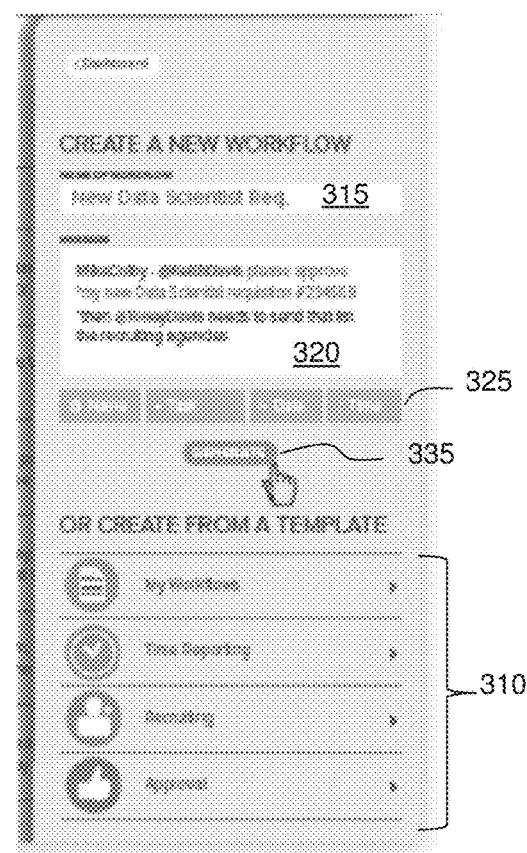
FIG. 4
FIG. 5

DYNAMIC WORKFLOW GENERATION

TECHNICAL FIELD

The invention relates to systems and methods of managing workflows and, more particularly, to systems and methods which implement dynamic workflow generation and related processes.

BACKGROUND

A workflow is an orchestrated pattern of business activity enabled by the systematic organization of resources into processes that provide certain services. A workflow can be divided into many different segments performed by individuals or groups of individuals within an organization. Also, workflows may be viewed as one fundamental building block to be combined with other parts of an organization's structure such as information technology, teams, projects and hierarchies.

SUMMARY

In a first aspect of the invention, a method implemented in a computer system comprises: providing a message panel, which provides linking functionality to link together a plurality of tasks to respective users assigned to complete each task of the plurality of tasks; linking the message panel to a subject topic such that each of the plurality of tasks and respective users assigned to complete each task in the message panel is linked to the subject topic; sending, in a single electronic communication action, the plurality of tasks assigned to the respective users within the message panel; receiving real-time status data of each of the plurality of tasks assigned to the respective users; mapping, within a database, the real-time status data of the plurality of tasks to the linked subject topic; and generating a summary for the tasks linked to the subject topic based on the mapping of the real-time status.

In another of the invention, a computer system for generating dynamic workflow processes, comprises a hardware memory device that stores program instructions and a processor that executes the program instructions and causes the computer system to: in a single interactive, fillable field, associate separate tasks to users which are assigned the separate tasks; associate the single interactive, fillable field with a common subject topic; in a single selective action, send each of the separate tasks to the users which are assigned the separate tasks; track the separate tasks and map a status of the separate tasks to the common subject topic; and generate a summary of the status of the separate tasks based on the common subject topic, wherein the summary is formatted to include at least each of the users which are assigned to the separate tasks, a summary explanation of the tasks, a completion status of an aggregate of the separate tasks, and a requested date of completion. The program instructions are stored on computer readable storage medium for execution by a CPU via computer readable memory In another of the invention, a computer program product comprises computer readable program instructions stored on non-transitory readable storage medium. The non-transitory readable program instructions causing a computing device to: associate a subject name to a message provided within a single message window, the message including a plurality of tasks, each of which is to associated with a particular user; send to a plurality of user, the message includes a plurality of tasks, each of which is to associated with a particular user; map the plurality of tasks together to the subject name, the mapping further includes mapping specific task to a specific individual, including contact information, and time and date of requested completion of the task; sequentially order the tasks to be completed in a preview display associated with the subject name; send the different tasks to the assigned users in a single action; and maintain a status of completion of an aggregate of the different tasks associated with the subject name.

BRIEF DESCRIPTION OF THE DRAWINGS

The present invention is described in the detailed description which follows, in reference to the noted plurality of drawings by way of non-limiting examples of exemplary embodiments of the present invention.

FIGS. 3-13 show various exemplary user interfaces (e.g., screen shots) which are representative of functionality and operability of processes and systems in accordance with aspects of the invention.

DETAILED DESCRIPTION OF ASPECTS OF THE INVENTION

The invention relates to systems and methods of managing workflows and, more particularly, to systems and methods which implement dynamic workflow generation and related processes. In embodiments, the dynamic workflow generation provides many technical features to solve one or more technical problems and/or provide a technical contribution to workflow processes, using real-time data sources. In particular, the systems and methods of the dynamic workflow generation include request, status and tracking of task capabilities, amongst other features, implemented over a computer network using real-time data sources.

The methods and systems of the dynamic workflow generation described herein monitor data from many different real-time data sources associated with tasks linked to a defined subject topic. By providing such monitoring of real-time data source capabilities, which is a very difficult and complex task amongst different groups of users, the methods and systems described herein provide one or more technical solutions to overcome the many known obstacles with current process flows, thereby providing significant improvements in current workflow management systems. For example, one technical solution includes providing a completion status of tasks from an aggregate of tasks associated with a defined subject.

By way of more specific example, the methods and systems described herein are implemented in a computer system over a computing network, linked to many different user devices, with many different applications and many different tasks/requirements/requests, etc. In implementing the methods and systems of the dynamic workflow generation described herein, in the least, control signals can be generated to (i) link certain tasks to a single subject, (ii) link certain tasks to certain individuals assigned to the specific task, (iii) send a plurality of the tasks within a single message window to the respective assigned users using a single action, (iv) monitor each of the tasks assigned to the singe subject, and (v) provide the status of these tasks, and, in particular, provide alerts and status summaries for open items, stale items and overdue items. In embodiments, the status can include a completion status of an aggregate of all the tasks linked to the single subject. In this way, the alerts and/or the status of the requested tasks are provided to a central user, showing performance and completion metrics, amongst other output metric information concerning different aspects of the workflow process. Moreover, different tasks assigned to different users can be linked together not only by subject matter, but also date and/or time of requested completion. In further embodiments, different tasks can be sent to different users in a sequential order, e.g., upon completion of a previous in the stream of tasks.

Figure 1:
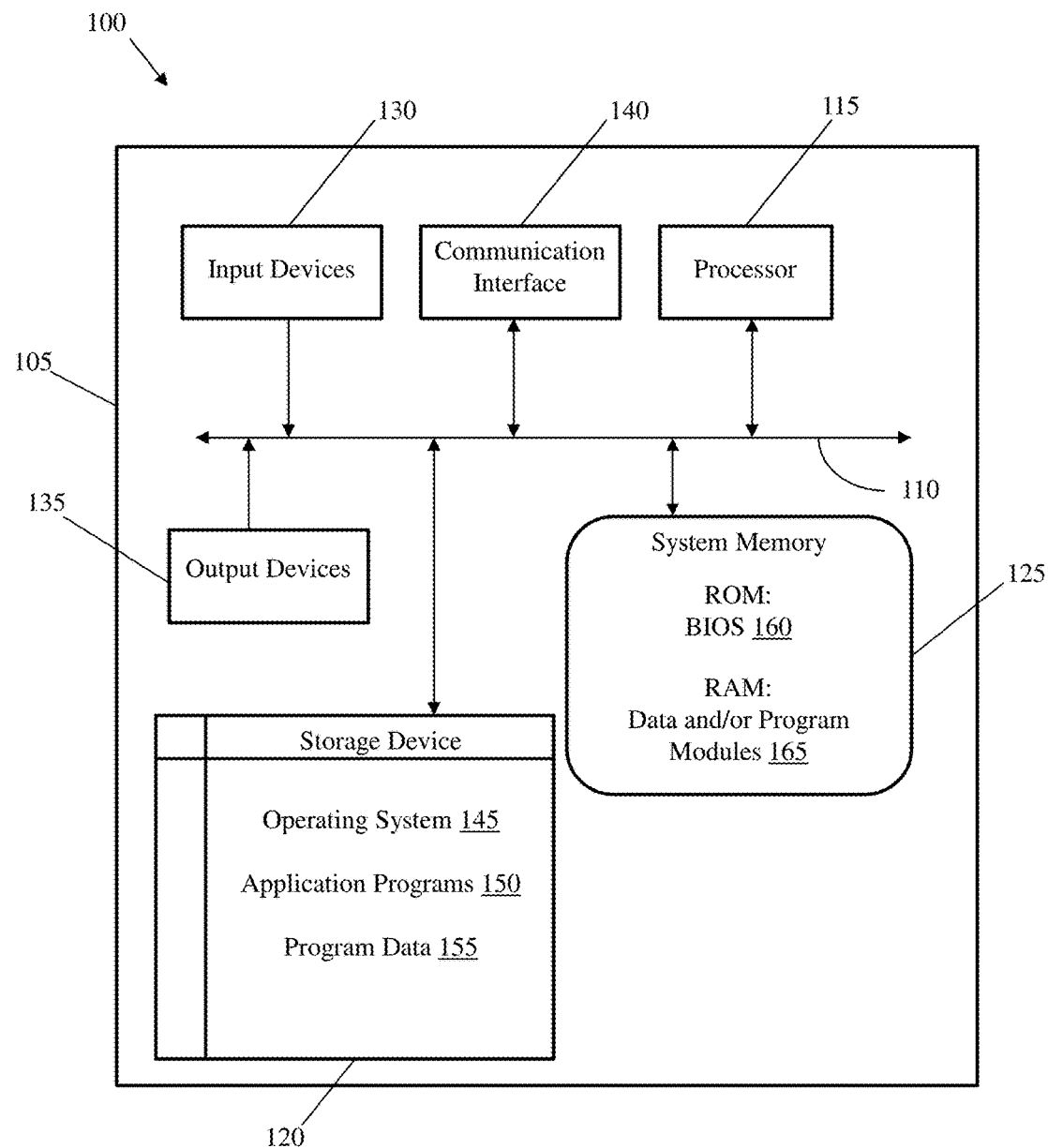
FIG. 1 is an illustrative architecture of a computing system implemented as embodiments of the present invention.

FIG. 1 is an illustrative architecture of a computing system 100 implemented as embodiments of the present invention. The computing system 100 is only one example of a suitable computing system and is not intended to suggest any limitation as to the scope of use or functionality of the invention. Also, computing system 100 should not be interpreted as having any dependency or requirement relating to any one or combination of components illustrated in computing system 100.

As shown in FIG. 1, computing system 100 includes a computing device 105. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors or microprocessors that include processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present invention, which may be operatively implemented by the computer readable program instructions.

For example, the processer 115 provides many technical solutions which can be implemented as one or more specialized tools, internal or external to the computing device 105. The processer 115 and/or specialized tools can be implemented as one or more program code stored in memory as separate or combined modules. Additionally, the processer 115 and/or specialized tools may be implemented as separate dedicated processors or a single or several processors to provide the function of these tools.

By way of more specific example, the processer 115, using real time data sources generated by actions of different users within the computing network, provides the following functionality, capabilities and/or operations any of which can be implemented on non-transitory computer readable media over the computing network.

(i) Automatically send tasks to any number of assigned users or group of users within a computer network system from a single message window linked to a common subject.

(ii) Monitor and track real-time data information of the tasks to provide updates, status and alerts related to the completion of any task or other output metrics associated with the requested tasks linked to a common subject.

(iii) By making a link between a common subject and the requested tasks, the systems and processes can aggregate, collate and/or order the tasks within a stream of tasks using a mapping function which can be stored, e.g., as a table, within the storage device described herein. This functionality allows the systems and methods to provide summaries of the different tasks linked to each common subject include a status of completion of each task as it relates to all of the tasks within the common subject.

(iii) Allow the users or groups of users to communicate and coordinate toward completion of the requested tasks.

(iv) Provide templates to assist the administrator in generating and sending of certain tasks to certain users and/or subjects. These templates can include name, date, time and task information as described further herein.

(v) Link different tasks into a single sequential task stream based on date of requested completion.

(vi) Show other performance and output metrics within a workflow process as further described herein.

In embodiments, processor 115 may receive input signals from one or more input devices 130 and/or drive output signals through one or more output devices 135 in order to provide the above functions and/or operations. The input devices 130 may be, for example, a keyboard or touch sensitive user interface (UI) as further described below. The output devices 135 can be, for example, any display device, printer, etc., as further described below.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present invention In embodiments, storage device 120 may store operating system 145, application programs 150, and program data 155 in accordance with aspects of the present invention.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The one or more input devices 130 may include one or more mechanisms that permit an operator to input information to computing device 105, such as, but not limited to, a touch pad, dial, click wheel, scroll wheel, touch screen, one or more buttons (e.g., a keyboard), mouse, game controller, track ball, microphone, camera, proximity sensor, light detector, motion sensors, biometric sensor, and combinations thereof. The one or more output devices 135 may include one or more mechanisms that output information to an operator, such as, but not limited to, audio speakers, headphones, audio line-outs, visual displays, antennas, infrared ports, tactile feedback, printers, or combinations thereof.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to implement dynamic workflow generation processes as described herein. In particular, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present invention. In additional or alternative embodiments, hardwired circuitry may be used in place of or in combination with the program instructions to implement the tasks, e.g., steps, methods and/or functionality, consistent with the different aspects of the present invention. Thus, the steps, methods and/or functionality disclosed herein can be implemented in any combination of hardware circuitry and software.

Figure 2:
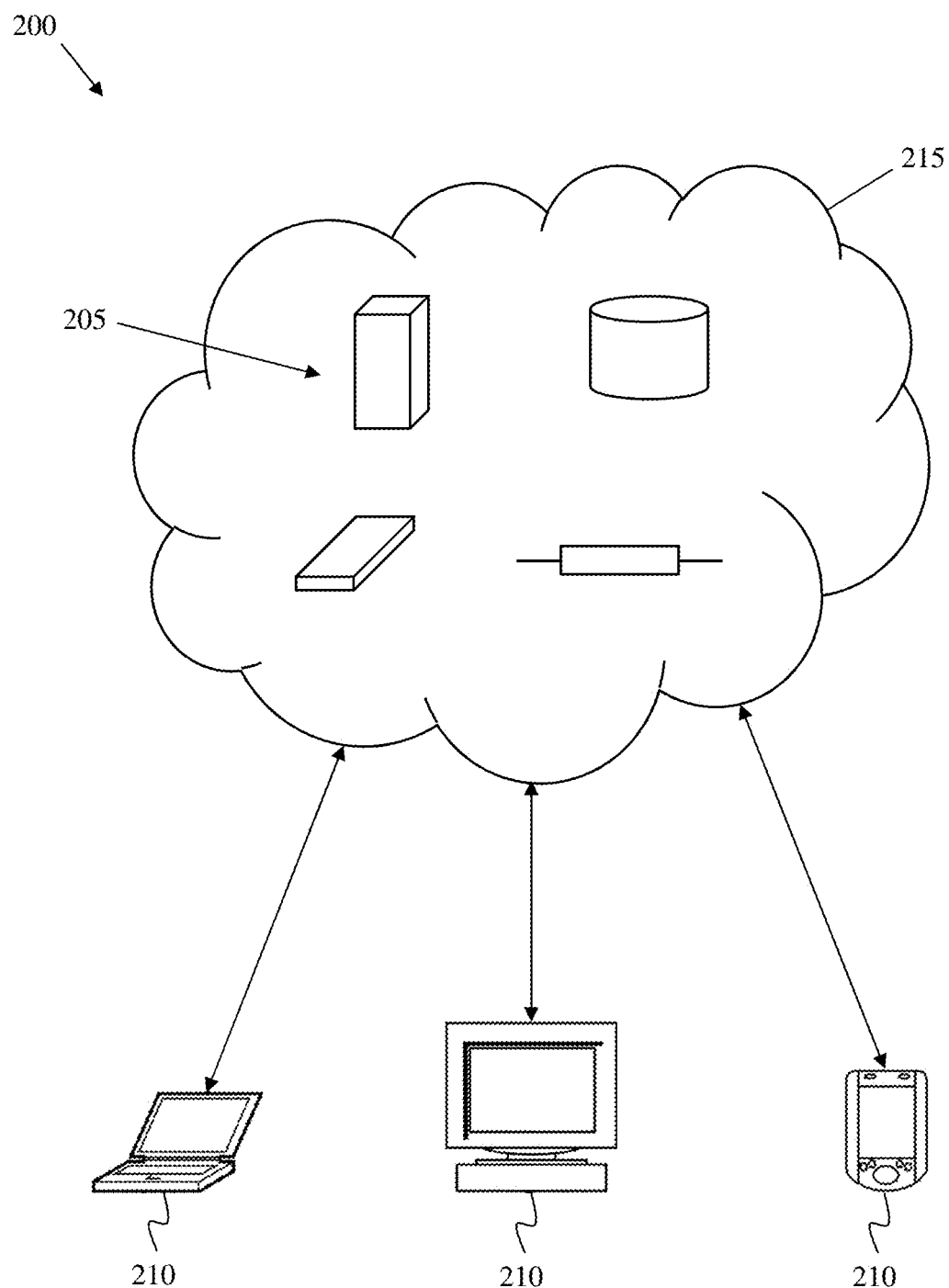
FIG. 2 shows an exemplary cloud computing environment in accordance with aspects of the invention.

FIG. 2 shows an exemplary cloud computing environment 200. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may includes one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

One or more cloud resources 205 may be conceptually structured in multiple layers. In one example, the layers include a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

In another example, one or more cloud resources 205 may be conceptually structured in functional abstraction layers including a hardware and software layer, a virtualization layer, a management layer, and a workloads layer. The hardware and software layer may include hardware and software components such as mainframes, RISC (reduced instruction set computer) architecture based servers, storage devices, networks and networking components, application server software, and database software. The virtualization layer may include virtual entities such as virtual servers, virtual storage, virtual networks, virtual applications, and virtual clients. The management layer may provide functions such as resource provisioning, metering and pricing, security, user portals, service level management, and service level agreement planning and fulfillment. The workloads layer may provide functions for which the cloud computing environment is utilized, such as mapping and navigation, software development and lifecycle management, data analytics and processing, and transaction processing.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

FIGS. 3-13 show example user interfaces or displays in accordance with aspects of the present invention. In embodiments, the example displays illustrate the various user capabilities and functions of the present invention in order to provide improvements to workflow processes amongst different users and/or groups. In embodiments, the example displays can use touch screens (e.g., by touching, swiping, etc.), keypad inputs, and/or mouse selection inputs to select icons, buttons, images, and/or any other selectable portion of an example display. The example displays illustrate certain user actions and displays, e.g., the ability to touch, swipe, tap, and/or perform any other type of action.

In embodiments, the exemplary displays are illustrative of a system, a method, and/or a computer program product and related functionality implemented on the computing system of FIG. 1 or the cloud environment of FIG. 2, in accordance with aspects of the present invention. The computer program product may include computer readable program instructions stored on computer readable storage medium (or media). The computer readable storage medium include the one or more storage medium as described with regard to FIG. 1, e.g., non-transitory media, a tangible device, etc. The method, and/or computer program product implementing illustrative displays can be downloaded to respective computing/processing devices, e.g., computing system of FIG. 1 as already described herein, or implemented on a cloud infrastructure as described with regard to FIG. 2. Accordingly, the processes associated with each illustrative display of described herein can be representative of a process or flow, implemented by special purpose hardware-based systems that perform the specified functions or acts or carry out combinations of special purpose hardware and computer instructions as described herein.

Figure 3:
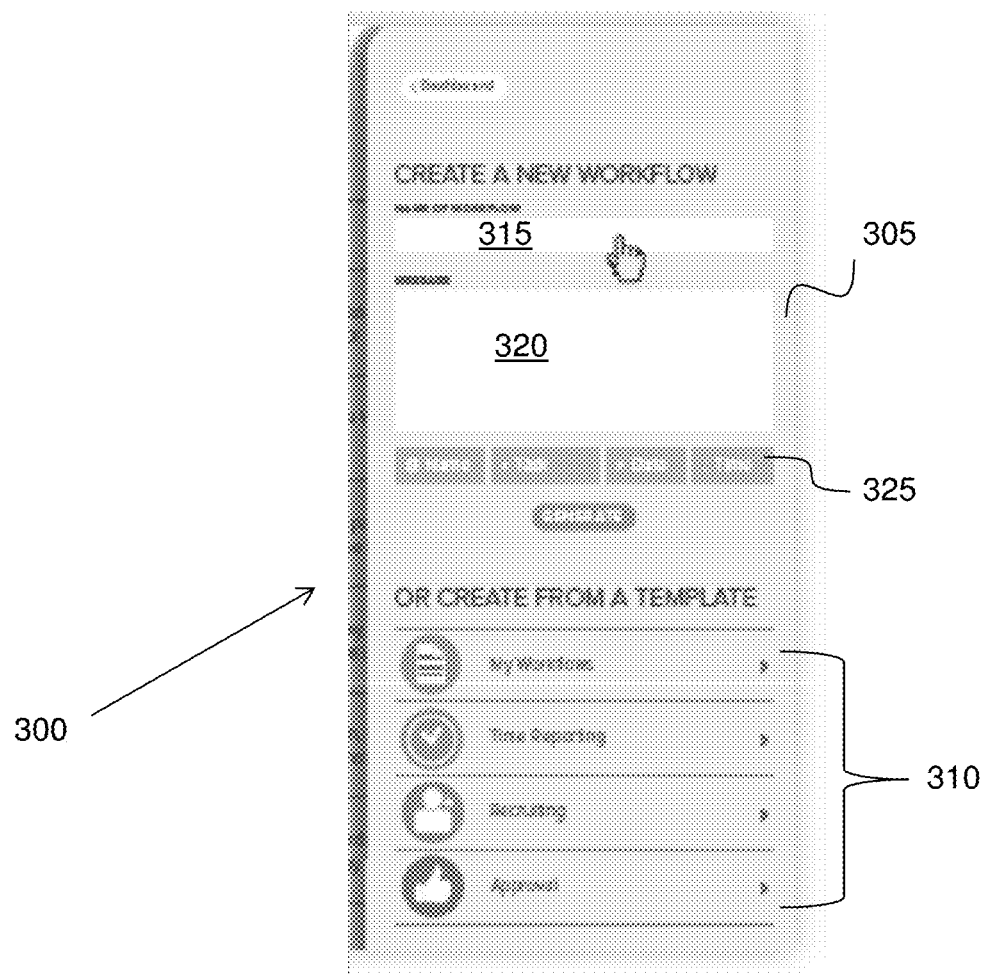

FIG. 3 shows an exemplary user display to begin the workflow process in accordance with aspects of the invention. In particular, the user display 300 includes a workflow creation panel 305 with corresponding fillable fields, functionality and templates. In embodiments, the workflow creation panel 305 can be provided by a simple command or click of an appropriate icon. The workflow creation panel 305 provides an administrative with options for sending a task, through a custom message that utilizes natural language or through the use of preexisting template categories (which store specific templates associated with the categories), as shown by reference numeral 310.

As to the option of sending a task through a custom message that utilizes natural language, the workflow creation panel 305 will include fillable fields 315, 320. In embodiments, the fillable field 315 allows administrator of the task to designate a name of a particular subject which will be associated or linked with tasks provided within the message field 320, e.g., "new data scientist req.". In the fillable field 320, the administrator can enter information, e.g., associated with a task to be completed, using, for example, natural language.

The customized message provided in fillable field 320 provides the administrative with very powerful functions including, e.g., automated name, task, date and time functionality as shown at reference numeral 325. For example, the "name" functionality allows the administrator to scroll through a list of pre-populated names (and their associated contact information) of users; whereas, the "task" functionality allows the administrator to scroll through a list of pre-populated requested tasks. The time and date function allow the administrator to set dates and times for completion of certain tasks provided within the fillable field 320. In embodiments, each of the name of the individuals, task, date and time can be linked together in a workflow stream, within the fillable field 320.

The pre-populated names and tasks can be provided by a learning algorithm, for example. Specifically, as the administrator enters different names and tasks, the systems and methods of the invention can learn these different names and the corresponding addresses associated with the names, as well as the different tasks (for future usage). This information can then be stored within a database or other storage system as shown in FIG. 1.

FIG. 4 shows an exemplary user display within the workflow process in accordance with aspects of the invention. In this display 400, the administrator can enter a name of the subject (of the tasks) in the fillable field 315. The subject topic provided in field 315 will be linked automatically to the message provided in field 320, and more specifically the specific tasks and associated users which are assigned to complete the tasks. In the message fillable field 320, the administrator can enter the message, e.g., specified tasks and associated users, etc., all of which are now linked to the subject topic provided in field 315. In embodiments, the subject topic and the linked information in field 320 can be mapped within a database.

In this example, certain designations can be used by the administrator to populate field 320. These designations will prompt the display 400 to automatically provide a pre-populated pop-up window 330 with certain information, e.g., names, groups, times, tasks, dates, etc. Alternatively, after entering the designation, the administrator can manually enter the necessary information. By way of illustrative and non-limiting example, the administrator can enter the following designations.

(i) Entry of "@" provides a pre-populated pop-up window of different people or groups of people. By selecting a particular person or group of persons, the message fillable field 320 will be auto-populated with the person's or groups' name and underlying communication information (e.g., email or SMS address information). In this way, when the administrator accepts (e.g., sends) the message, it will automatically be sent to all of the recipients in the message.

(ii) Entry of "*" provides a pre-populated pop-up window of different tasks that need to be completed by a particular person or group of people. In embodiments, the task can automatically be linked to the associated person or group of persons within the command string under the common subject.

(iii) Entry of ">" provides a pre-populated pop-up window of different dates in which a particular task for a particular person or group of people needs to be completed, as requested by the administrator. In embodiments, the requested date of completion can automatically be linked to the task and associated person or group of persons within the command string under the common subject.

(iv) Entry of ":" provides a pre-populated pop-up window of different times in which a particular task for a particular person or group of people needs to be completed, as requested by the administrator. In embodiments, the requested time of completion can automatically be linked to the task and associated person or group of persons within the command string under the common subject.

It should be understood by those of ordinary skill in the art that different designations can be used, and that the above designations are provided only for illustrative purposes. Also, similar to the use of designations as noted above, the administrator can also select one of the functions as designated by reference numeral 325. Moreover, although the above is described with reference to the use of pre-populated pop-up windows, it should be understood by those of skill in the art that the administrator can manually enter the necessary information. In any scenario, the designations will automatically link together the task, person or group, time and date of completion, if applicable, within the command string and each of which will automatically be associated with the common subject.

In embodiments, by implementing a date and/or time function, when the workflow is sent out to the individual recipients, it can be documented in sequential steps. In this way, a first task may be sent to a first person and, upon its completion, a second task, which is dependent on the first task being completed, will be sent to a second person. If the first task is not completed, the workflow or stream of tasks will be stuck at the first task or other stage that is not completed. Once any of the tasks are completed, it can be date stamped and the systems and methods update themselves. In this way, the systems and methods of dynamic workflow generation can aggregate all of the individual tasks, determine which are completed, and then provide a status to the administrator of complete tasks. This status can be a percentage or particular number of tasks of the total number of tasks completed as calculated by the computer system of FIG. 1, and mapped in the storage system in, e.g., a table format.

Figure 6:
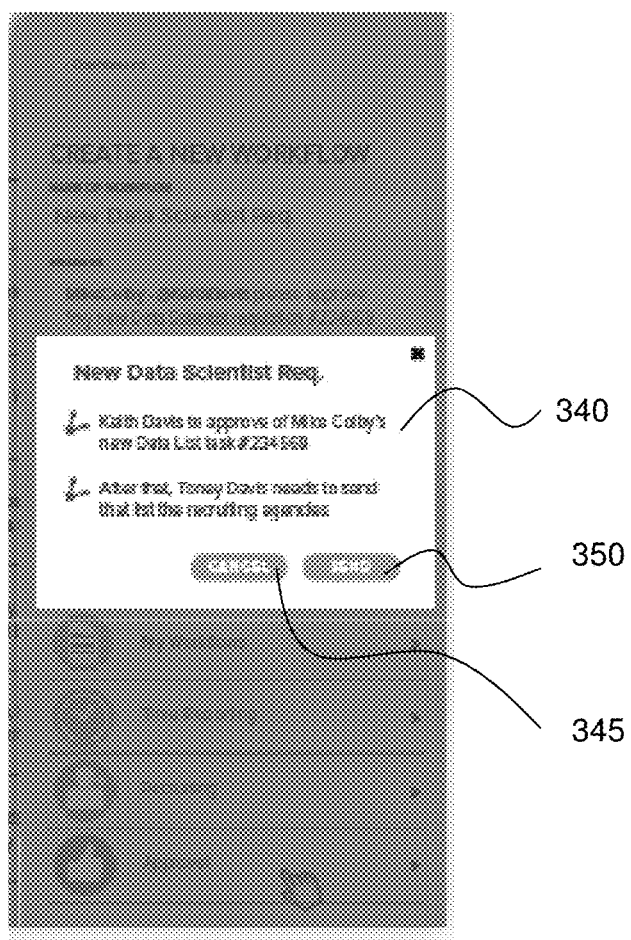

As shown in FIGS. 5 and 6, the administrator can preview the message by selecting the "generate" icon 335. By selecting such "generate" icon 335, a preview window 340 will automatically be generated as shown in FIG. 6. Interestingly, the preview window 340 will provide a summary of the tasks, including key points (based on the natural language usage), as well as which person or group of persons will be responsible for certain requested tasks, and the requested time and date of completion, if any, within the command strings. In embodiments, the information in the preview window can be segregated by time or person or group by the systems and processed described herein; compared to the message fillable field 320 which can include information entered in any random order.

In more specific embodiments, the preview window 340 shown in FIG. 6 is configured to display the temporal relationship of each task that needs to be completed, as linked together by the generation workflow processes described herein. In particular, the entire message generated from the message fillable field 320 can be parsed into sections based on, e.g., person and/or group (and underlying address information), date and/or time of completion, and linked together by a common subject, e.g., "new data scientist req." The linking can be provided as a mapped function, within a database or storage system shown in FIG. 1.

In embodiments, the administrator can cancel the preview window 340 by selecting the "cancel" icon 345 or accept and send the message to each of the assigned users (with the assigned task) by selecting a single "send" icon 350. In the case of cancellation, the systems and methods will revert to the message fillable field 320 shown in FIG. 5 where the administrator can edit or modify the message, in some manner. For example, the sender's or recipients' information can be changed, or the task, time or date can be changed or added. Once a message has been updated, the administrator can again select the "generate" icon 335 in FIG. 5 to generate an updated preview window 340 (similar to that shown in FIG. 6).

In the scenario that the administrator selects the "send" icon 350, each task within the message will then be sent directly to each of the designated recipients or group of recipients provided within the message using a single action (as the underlying contact information is already associated with the list of persons, etc.), date and/or time of completion. In embodiments, only portions of each message related to the individual requested to complete a task will be sent to that individual. In alternative embodiments, the entire message can be sent to each individual, or it can be posted to a social network so that each of the individuals can see a particular thread. Also, in embodiments, the tasks under the common subject can be sent to individual users in a sequential order as tasks are completed. For example, task 2, which is dependent on task 1 being completed, will be sent to the individual associated with task 2 only upon completion of task 1.

Figure 10:
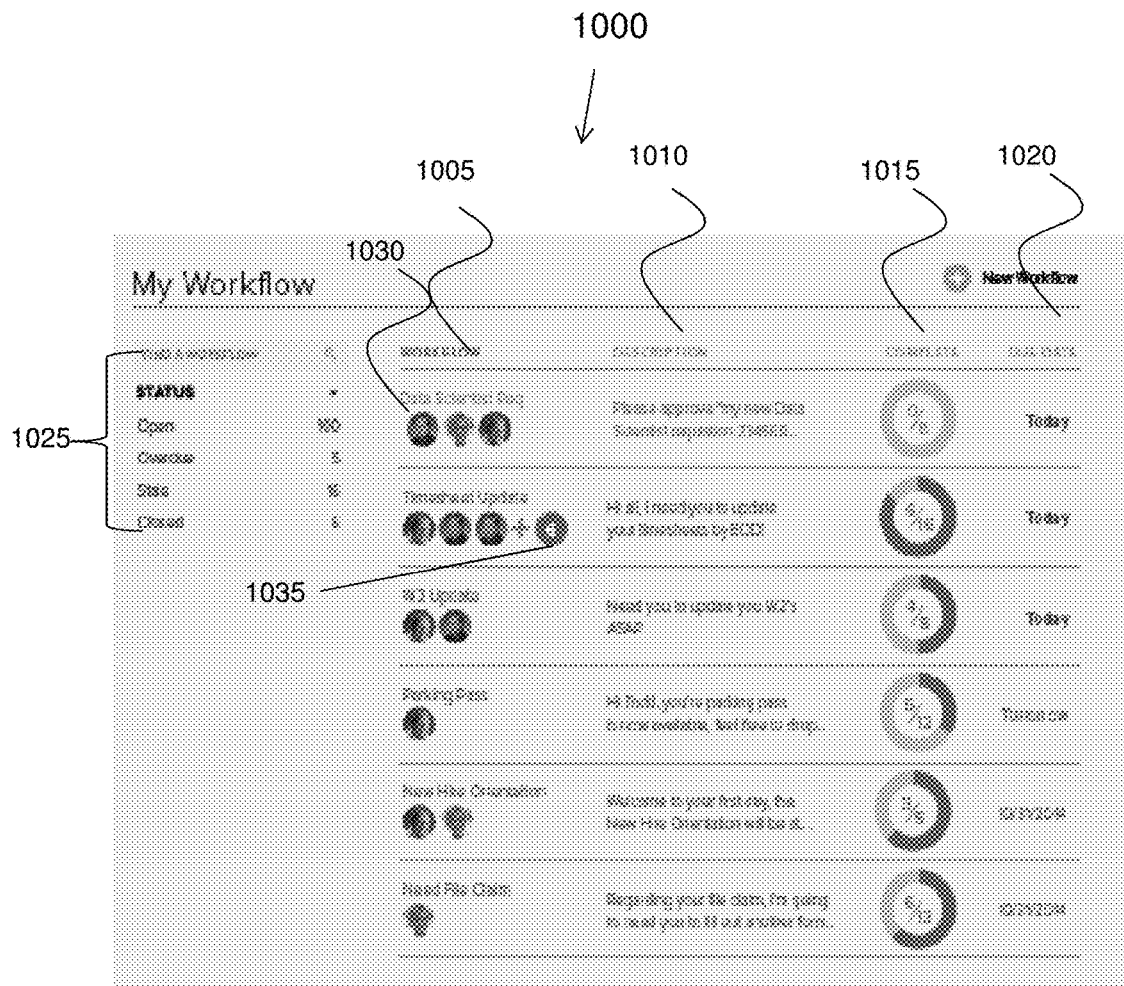
Figure 13:
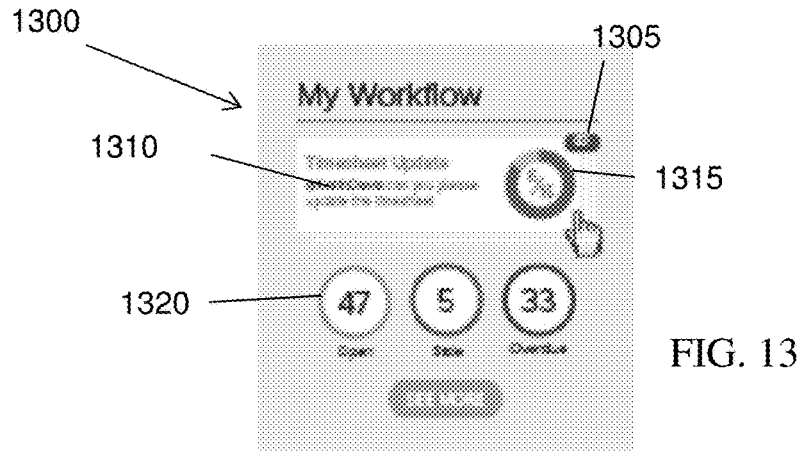

In embodiments, the dynamic workflow generation processes will aggregate this information and provide a summary to the administrator of tasks, people, times, completion percentage and other output metrics, in real-time, as well as communication links and other information as described with regard to at least FIGS. 10 and 13.

Figure 7:
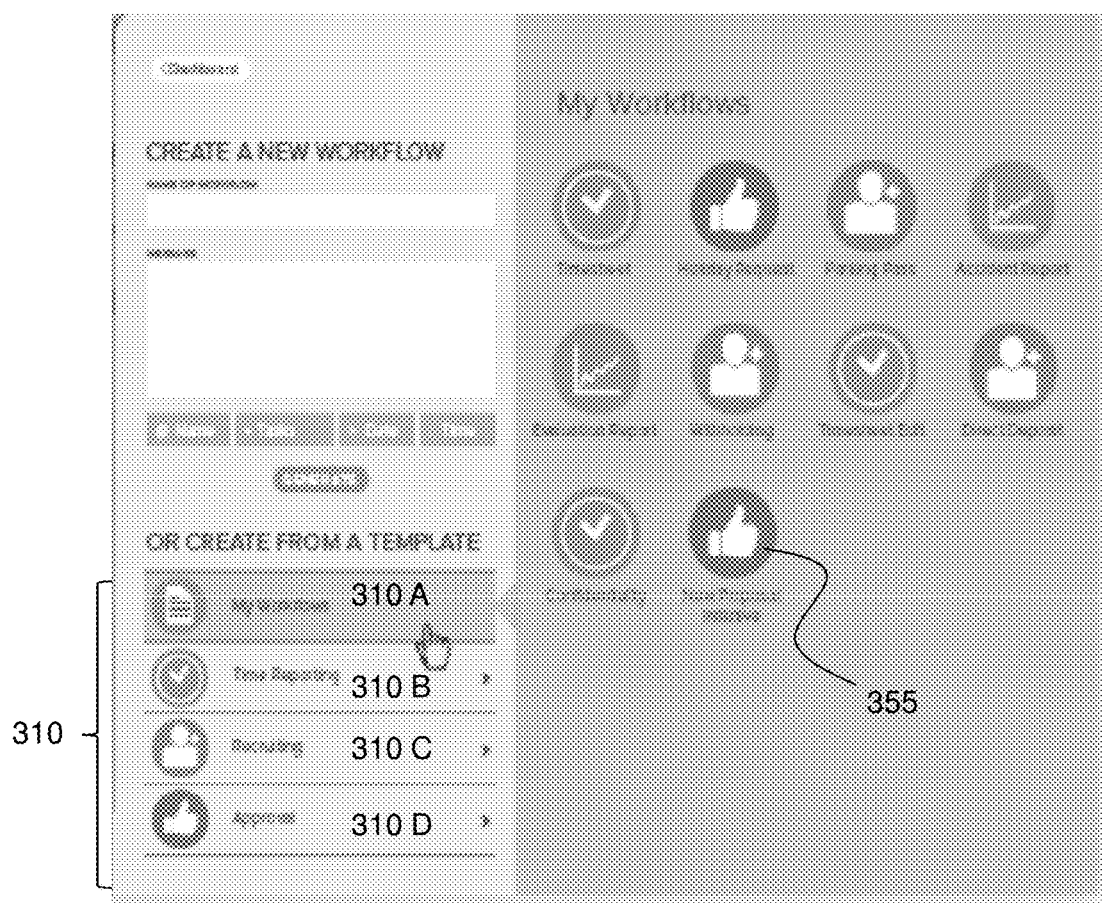

FIG. 7 shows an exemplary user display to begin the workflow process using one or more of the template categories 310 in accordance with aspects of the invention. In this process flow, the administrator can select any of the template categories 310A-310D to begin the workflow process. Although four template categories are shown representatively in FIG. 7, it should be understood by those of skill in the art that any number of template categories can be provided by a developer of the workflow generation processes and systems of the invention.

By way of example, template category 310A includes customized templates created by the administrator and shown representatively by icons 355. These templates 355 can include: timeslips, holiday requests, parking passes, accident report, evaluation report, withholding, timesheet edit, direct deposit, confidentiality, new proposal initiate, amongst other custom templates created by the administrator. In embodiments, the templates within template category 310A can be locally stored on an administrator's computing device or can be accessed through a network communication system, e.g., intranet, extranet, etc. Each of the templates can include a distinguishable logo with file name, as an example.

On the other hand, templates 310B-310D are standardized or global templates, each of which are stored on a centralized database and accessible by any administrator of an entity (e.g., organization) via a network communication described herein. In embodiments, template category 310B is associated with time reporting, template category 310C is associated with recruiting and template category 310D is associated with approval, amongst others. As should be understood by those of skill in the art, each of these template categories will include templates as described with respect to template category 310A.

Figure 8:
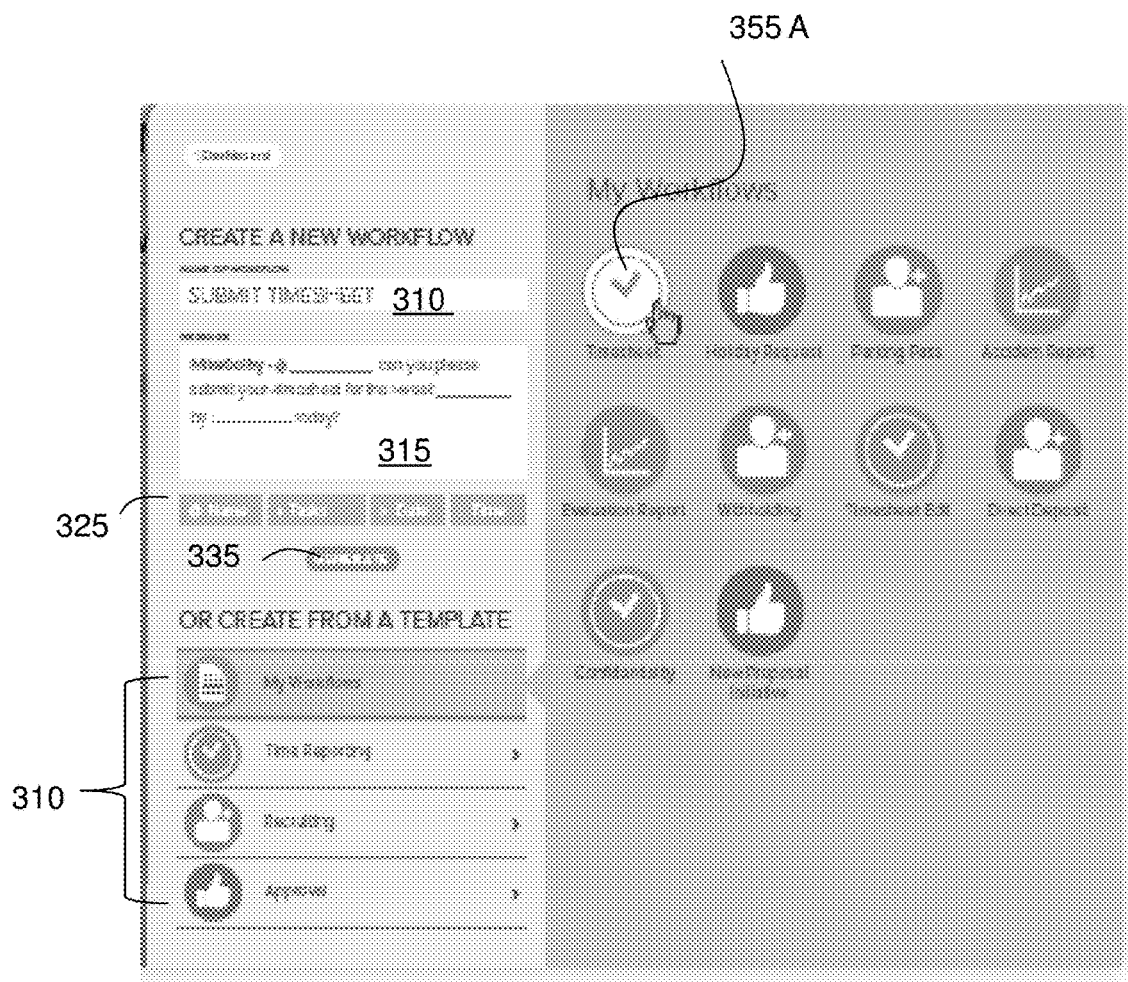
Figure 9:
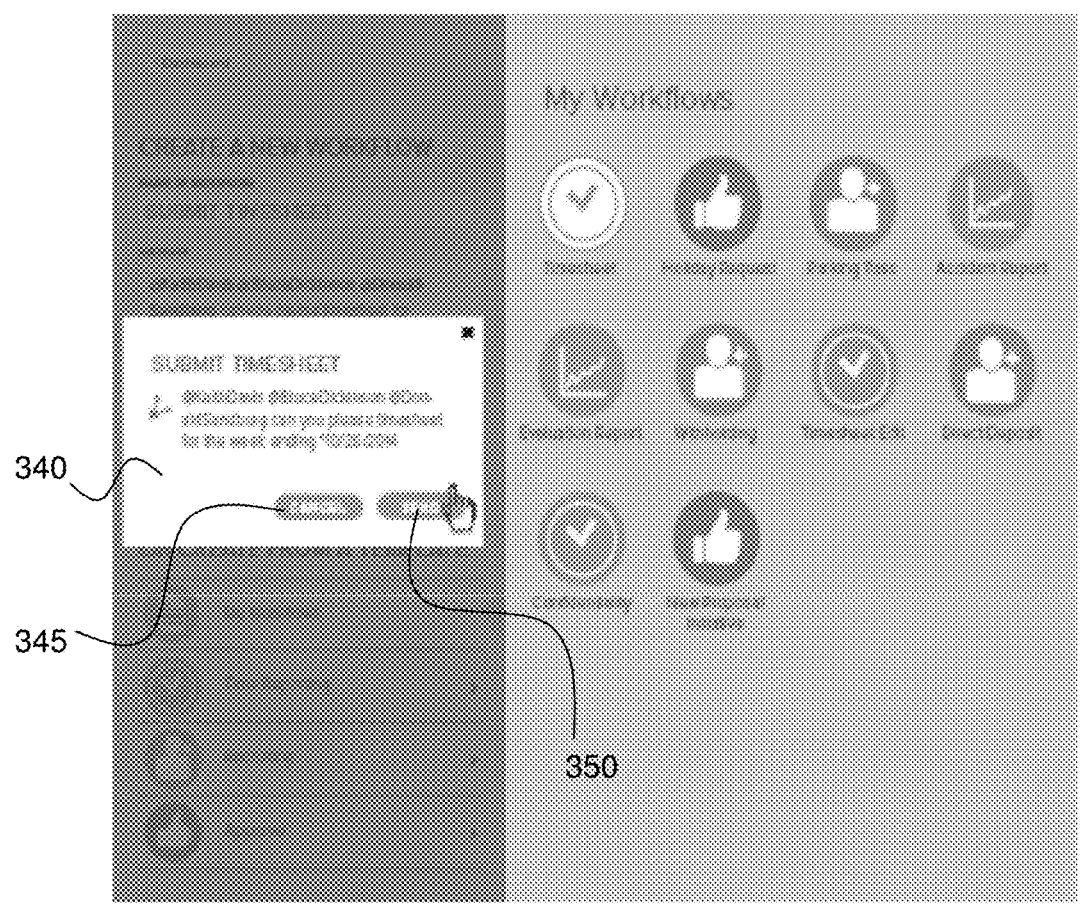

Selection of a particular template category, e.g., template category 310A, and a respective template, e.g., Timesheet, will allow the administrator to begin creating a new workflow, e.g., message. For example, as shown in FIG. 8, upon selection of the "Timesheet" icon 355A, the form's information will automatically populate both the subject field 315 and message field 320. From there, the administrator can upload or complete the message field 320 using natural language semantics as already described herein. And, as already described herein, and shown in FIG. 9, once the fields 315, 320 are completed to the satisfaction of the administrator, the administrator can then generate the message in a preview window. From this stage, the administrator can cancel the message (by selection of the "cancel" icon 345) for further editing, modification, etc. or send the message (by selection of the "send" icon 350) to the recipients within the message.

FIG. 10 shows an exemplary display which summarizes tasks and other information in accordance with aspects of the invention. In embodiments, the exemplary display 1000 is scrollable and includes workflow information related to tasks, categorized by subject or workflow, as designated by column 1005. The workflow information in column 1005 includes each person or group of persons which are responsible for certain tasks associated with the subject matter, e.g., "new data scientist req." In embodiments, the most recently created subject will be displayed at the uppermost row of the display 1000; although other organizational preferences can be provided by the administrator.

The exemplary display 1000 further includes, for each subject, a row comprising a description of the tasks (shown at column 1010), a percentage completion of the task (shown at column 1015) and the requested date of completion (shown at column 1020), in addition to the each person associated with the tasks, etc. In embodiments, as described herein, each of (i) the persons or group of persons which are responsible for certain tasks associated with the subject matter, e.g., "new data scientist req." (ii) summary of the tasks, (iii) percent completion and (iv) due date, if available, are linked together by the common subject. Also, selection of any workflow item such as a particular row, icon, subject, etc., will provide the administrator with more granular information associated with the tasks as described with regard to FIG. 12, for example.

As a particular task associated with a particular subject is completed, the percent completion column 1015 can be automatically updated using real-time data sources. That is, the systems and methods described herein will automatically update the completion percentage, in real-time, as they become completed. In embodiments, the percent completion column 1015 can include a graphical display and numerical display, designating the completion rate or percentage of the aggregate of tasks. For example, as a graphical display, a circle designated by different colors can be displayed, with a color representing a particular completion percentage as it relates to the area of fill within the circle or about a circumference of the circle. The numerical representation, on the other hand, can be provided in a fraction format, with the denominator designating the number of tasks to be completed and the numerator designating the number of tasks completed.

As further shown in FIG. 10, the exemplary display 1000 further includes a summary status of tasks, generally shown at reference numeral 1025. The status can include, e.g., open status, overdue status, stale status and canceled status. In embodiments, selection of any of the status will automatically display additional information associated with the status, e.g., which tasks remain open, etc., which individuals need to complete or have completed particular tasks, etc. In further embodiments, the administrator can filter the workflow by tasks that are open, stale and overdue by selection thereof. In this scenario, the exemplary display 1000 can be updated with the information of any open, stale or overdue tasks, in a format similar to that already shown in FIG. 10.

In further embodiments, in order to maximize space usage of the exemplary display 1000, icons of people associated with a particular subject can be displayed, with any additional persons represented by the numbered icon 1030. As should be understood by those of skill in the art, the number within the numbered icon 1030 can be representative of the number of additional persons or groups which were assigned a task associated with a particular subject. By selecting this numbered icon 1030, a pop-up window can be displayed which shows the names of the additional people which were assigned a task.

Figure 11:
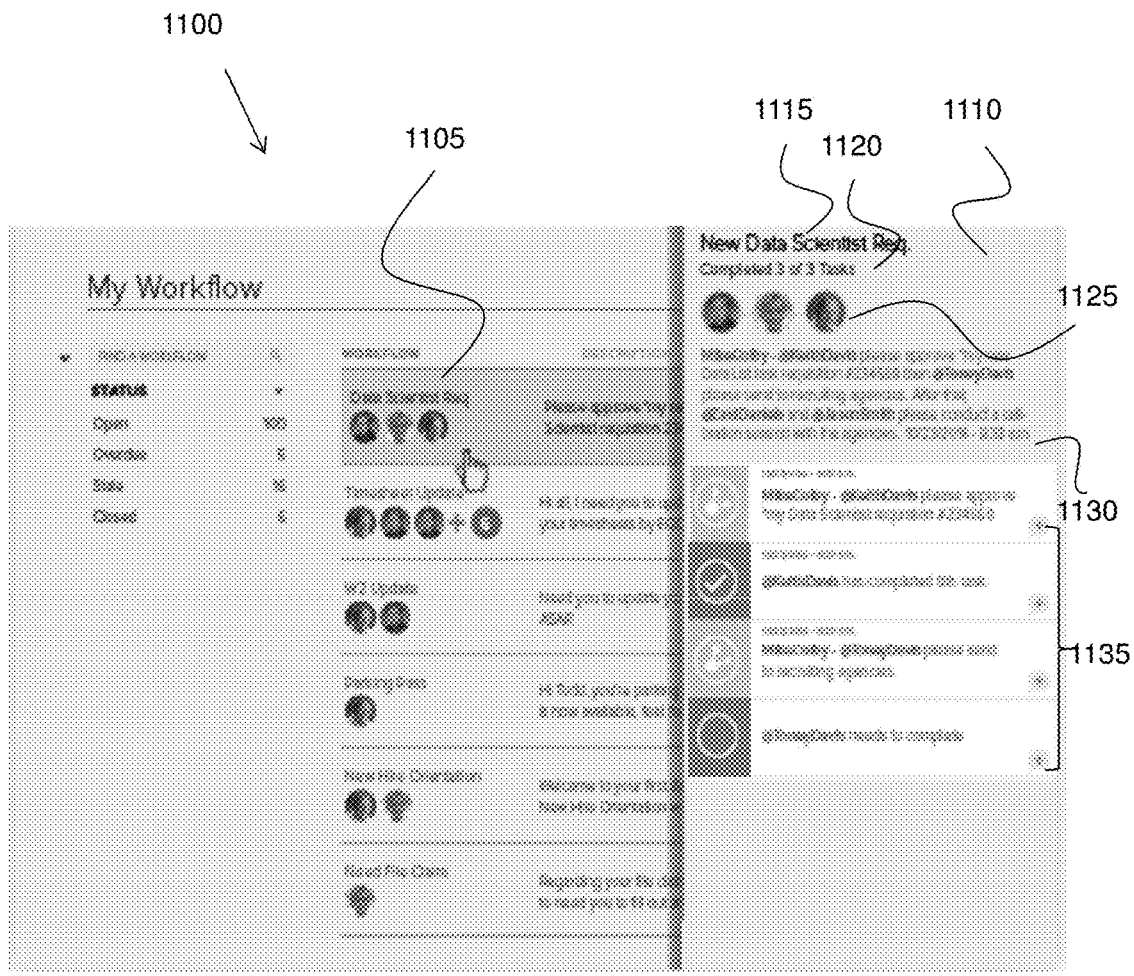

FIG. 11 shows an exemplary display 1100 which provides a summary of information associated with a particular subject, e.g., "new data scientist req." For example, by selecting the row 1105, e.g., "new data scientist req.", a summary panel 1110 will be presented showing information associated with tasks and other information in accordance with aspects of the invention. By more specific example, the summary panel 1110 shows the following information, which has been updated in real-time by use of data sources received/sent to the computing device of the administrator (or a central server which is accessible by the administrator) in accordance with aspects of the invention.

(i) The workflow title, e.g., subject, as shown at reference numeral 1115.

(ii) The number of completed tasks as shown at reference numeral 1120.

(iii) The persons which are responsible for certain tasks, as shown at reference numeral 1125. It should be noted that by selection of the icons associated with any of the persons, it is possible to automatically send a message to such person via email, text message or other communication mechanism. Also, in embodiments, selection of the particular icon can generate a more granular description of the tasks required by the person, the status of such tasks, etc.

(iv) The original message sent from the administrator as shown at reference numeral 1130.

(v) The status of each of the individual tasks as shown at reference numeral 1135. In embodiments, representative icons can also be displayed with the status, each of which can be representative of a certain completion thereof. For example, a check mark can be representative of a completed task.

Figure 12:
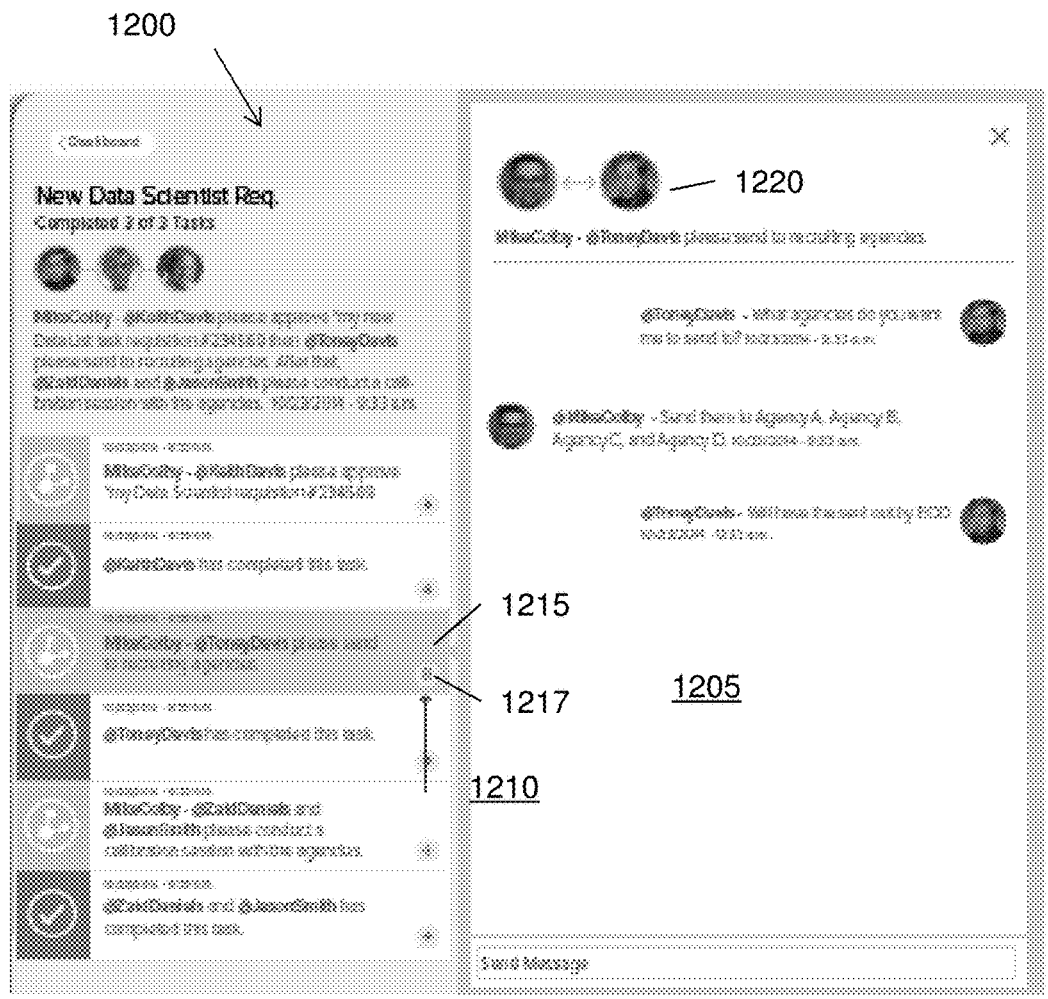

FIG. 12 shows an exemplary communications display 1200 which provides the capabilities to communicate amongst the different users in accordance with aspects of the invention. For example, if a user does not understand the assigned task, the user is provided with the capabilities to discuss the task with the administrator. This communication can be text message, instant message or other communication type, e.g., social media. By way of example, upon request by the user assigned to a task, the display 1200 can include a communication panel 1205. This communication panel 1205 includes a message window 1210, which can be displayed by selection of icon 1215. Moreover, a quote bubble 1217 can be provided which visually displays an alert to the administrator that a user has requested information. The icon 1215 can also include a number indicative of the amount of back and forth communication between the administrator and the user assigned to a task. The communication panel 1205 can also include a visual display of the users of the conversation, at reference numeral 1220.

FIG. 13 shows a dashboard or summary display in accordance with aspects of the invention. The dashboard or summary display 1300 allows the administrator to view the many different workflows, in a summary fashion in its current state. For example, the dashboard or summary display 1300 can be constantly updated with data sources or data items associated with a task as it is completed, or a new task is assigned. The systems and methods of the invention can aggregate the list of tasks and calculate which tasks are completed and provide a numerical value of such completion rate. In further embodiments, icon 1305 can show a numerical value which is indicative of a task that has been updated by an assigned user. Also, the dashboard or summary display 1300 includes one or more tiled panels 1310, which show a summary status of the tasks for each subject. In addition, the dashboard or summary display 1300 includes a visual display 1315 which is representative of the completion rate of the tasks for the particular subject as described herein, e.g., percentage or fraction of completion. The dashboard or summary display 1300 also includes a status of open, stale and overdue tasks, as shown at reference numeral 1320.

In embodiments, the dashboard or summary display 1300 provides the administrator the ability to view any of these different features by selection, e.g., click, of the different icons, tiled panels, etc. That is, by selecting any of these different features, the systems and processes described herein will automatically bring the administrator to a more detailed view of such requested information such as that shown in FIG. 10.

Figure 14:
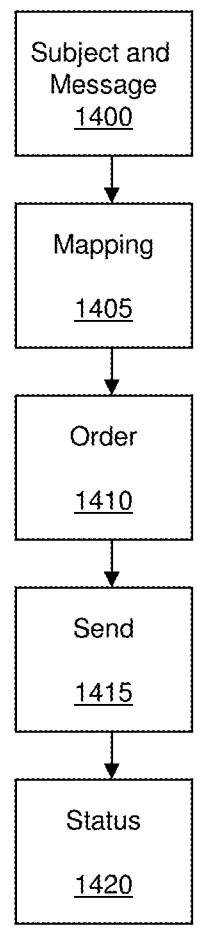
FIG. 14 depicts an exemplary flow for a process in accordance with aspects of the present invention.

FIG. 14 depicts an exemplary flow for a process in accordance with aspects of the present invention. The exemplary flow can be illustrative of a system, a method, and/or a computer program product and related functionality implemented on the computing system of FIG. 1, in accordance with aspects of the present invention. The computer program product may include computer readable program instructions stored on computer readable storage medium (or media). The computer readable storage medium include the one or more storage medium as described with regard to FIG. 1, e.g., non-transitory media, a tangible device, etc. The method, and/or computer program product implementing the flow of FIG. 14 can be downloaded to respective computing/processing devices, e.g., computing system of FIG. 1 as already described herein, or implemented on a cloud infrastructure as described with regard to FIG. 2. Accordingly, the processes associated with each flow of the present invention can be implemented by special purpose hardware-based systems that perform the specified functions or acts or carry out combinations of special purpose hardware and computer instructions.

Referring to FIG. 14, at step 1400, an administrator enters a subject topic and message to be sent to a plurality of user. In embodiments, the message includes a plurality of tasks, each of which is to be completed by a particular user. The tasks assigned to each user can be associated with an underlying electronic address of each of the assigned users. This message and subject can be recorded in a database shown, e.g., in FIG. 1.

At step 1405, the systems and processes will map the tasks to the subject topic. In embodiments, the mapping includes mapping specific tasks to a specific individual, including contact information, time and date of requested completion etc., each of which will be linked to the subject topic. In embodiments, at step 1410, the systems and processes will sequentially order the tasks to be completed under the common subject topic in a preview display prior to sending of the assigned tasks to the individuals. At step 1415, the systems and processes will send the different tasks to the assigned individuals. In embodiments, the assigned tasks can be sent in a sequential order such that a subsequent task, which is dependent on completion of a previous task, will only be sent to an assigned user when the previous task has been completed. In this way, the systems and processes will monitor the completion of tasks, and upon making a determination that a previous task is completed, it will then send the next task to a user for completion.

At step 1420, the systems and processes will maintain a status of completion, open, stale and closed tasks. By way example, the systems and processes of the present invention can aggregate together all of the tasks assigned or linked to a single common subject topic, and upon determining that certain tasks have been completed, can calculate a completion status of the different tasks of the common subject topic. This status can include the percentage completion, the users that have completed their tasks or have not yet completed their tasks, date of requested completion, as well as other output metrics as described herein.

The foregoing examples have been provided merely for the purpose of explanation and are in no way to be construed as limiting of the present invention. While aspects of the present invention have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although aspects of the present invention have been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method implemented in a computer system comprising:
   providing a message panel, which provides linking functionality to link together a plurality of tasks to respective users assigned to complete each task of the plurality of tasks;
   linking the message panel to a subject topic such that each of the plurality of tasks and respective users assigned to complete each task in the message panel is linked to the subject topic;
   sending, in a single electronic communication using a single action, the plurality of tasks assigned to the respective users within the message panel;
   receiving real-time status data of each of the plurality of tasks assigned to the respective users;
   mapping, within a database, the real-time status data of the plurality of tasks to the linked subject topic; and
   generating a summary for the tasks linked to the subject topic based on the mapping of the real-time status.

2. The method of claim 1, further comprising tracking completion of each of the plurality of tasks linked to the subject topic.

3. The method of claim 1, wherein each of the plurality of tasks and respective users assigned to complete each task are aggregated together for the subject topic and based on the aggregate, a percentage completion of the plurality of tasks is calculated based on a detected completion of each task of the plurality of tasks.

4. The method of claim 1, wherein each of the plurality of tasks is documented by requested date of completion.

5. The method of claim 4, wherein a task, dependent on a completion of a previous task, is automatically sent to an assigned user upon the previous task being completed.

6. The method of claim 1, wherein, for the message panel, the plurality of tasks and respective users assigned to complete each task is generated into a preview page prior to the sending.

7. The method of claim 6, wherein the preview page is generated to include a list of each of the plurality of tasks and respective users assigned to complete each task in date of completion order.

8. The method of claim 1, further comprising providing fillable fields for entry of the subject topic, the plurality of tasks and respective users assigned to complete each task of the plurality of tasks.

9. The method of claim 8, wherein the plurality of tasks, the respective users assigned to complete each task of the plurality of tasks, and the subject topic is provided within the fillable fields by at least one of natural language and auto generated by use of a plurality of templates.

10. The method of claim 8, further comprising providing pre-populated selectable designations for populating the finable fields, comprising at least one of: a name of a user assigned to each task, with associated electronic contact information for automatically sending the assigned task to the user by the single action from the message panel, task description, and date and time for completion of each task.

11. The method of claim 1, wherein the generating the summary for the subject topic comprises generating a scrollable page comprising a plurality of rows associated with a plurality of summaries associated with different subject topics, and further comprising within each row for each subject topic, a listing of users assigned to each task to be completed, a summary of the tasks assigned, completion status of an aggregate of the tasks to be completed and a requested date of completion.

12. The method of claim 11, wherein the summary for the subject topic is expandable to include additional information about the tasks assigned to the users.

13. A computer system for generating dynamic workflow processes, comprising:
   a hardware memory device that stores program instructions; and
   a processor that executes the program instructions and causes the computer system to:
      in a single interactive, fillable field, associate separate tasks to users which are assigned the separate tasks;
      associate the single interactive, fillable field with a common subject topic;
      in a single selective action, send all of the separate tasks to the users which are assigned the separate tasks;
      track the separate tasks and map a status of the separate tasks to the common subject topic;
      generate a summary of the status of the separate tasks based on the common subject topic, wherein the summary is formatted to include at least each of the users which are assigned to the separate tasks, a summary explanation of the tasks, a completion status of an aggregate of the separate tasks, and a requested date of completion; and
      link the separate tasks into a single sequential task stream based on the requested date of completion,
      wherein the program instructions are stored on computer readable storage medium for execution by a CPU via computer readable memory.

14. The computer system of claim 13, wherein the summary of the status is expandable to provide additional information associated with the summary status.

15. The computer system of claim 14, wherein the single interactive, fillable field is generated into a preview page, segregated by task and user name, prior to the sending.

16. The computer system of claim 14, wherein the single interactive, fillable field is fillable by at least one of natural language and by templates.

17. The computer system of claim 16, further comprising providing pre-populated selectable designations from a learning algorithm which has learned the separate tasks for populating the single interactive, fillable field, comprising at least one of: a name of a user assigned to each task with associated electronic contact information for automatically sending the assigned task to the user, a task description, and date and time for completion of each assigned task all linked together in a stream of tasks.

18. The computer system of claim 13, wherein each of the separate tasks is documented by requested date of completion.

19. The computer system of claim 18, wherein a task dependent on a completion of a previous task is automatically sent to an assigned user upon the previous task being completed.

20. A computer program product comprising computer readable program instructions stored on non-transitory readable storage medium, the non-transitory readable program instructions causing a computing device to:

associate a subject name to a message provided within a single message window, the message including a plurality of tasks, each of which is to associated with a particular user;

send to a plurality of users using a single action, the message which includes a plurality of tasks, each of which is to be associated with a particular user;

map the plurality of tasks together to the subject name, the mapping further includes mapping specific task to a specific individual, including contact information, and time and date of requested completion of the task;

sequentially order the tasks to be completed in a preview display associated with the subject name;

send the different tasks to the assigned users in a single action; and maintain a status of completion of an aggregate of the different tasks associated with the subject name.

\* \* \* \* \*